(12) United States Patent
Wilson

(10) Patent No.: US 8,325,010 B2
(45) Date of Patent: Dec. 4, 2012

(54) PHYSICAL ADDRESSING FOR TRANSIENT VOLTAGE SURGE SUPPRESSOR MODULES

(75) Inventor: Glenn Wilson, Endicott, NY (US)

(73) Assignee: Emerson Electric Co., St. Louis, MO (US)

( * ) Notice: Subject to any disclaimer, the term of this patent is extended or adjusted under 35 U.S.C. 154(b) by 484 days.

(21) Appl. No.: 12/701,012

(22) Filed: Feb. 5, 2010

(65) Prior Publication Data

US 2011/0193683 A1  Aug. 11, 2011

(51) Int. Cl.
*H04Q 3/00* (2006.01)
*H02J 13/00* (2006.01)
(52) U.S. Cl. .................. 340/9.16; 340/9.1; 340/9.17
(58) Field of Classification Search ............... 340/9.1, 340/9.16, 91.7
See application file for complete search history.

(56) References Cited

U.S. PATENT DOCUMENTS

| | | | | | |
|---|---|---|---|---|---|
| 4,626,846 | A | * | 12/1986 | Parker et al. | 340/9.16 |
| 5,065,154 | A | * | 11/1991 | Kaiser et al. | 340/9.1 |
| 5,262,771 | A | * | 11/1993 | Herrmann et al. | 340/3.31 |
| 5,553,258 | A | * | 9/1996 | Godiwala et al. | 711/3 |
| 5,576,698 | A | * | 11/1996 | Card et al. | 340/9.16 |
| 2002/0024326 | A1 | * | 2/2002 | Lestician | 323/276 |

* cited by examiner

*Primary Examiner* — Brian Zimmerman
*Assistant Examiner* — Omer S Khan
(74) *Attorney, Agent, or Firm* — McDonnell Boehnen Hulbert & Berghoff LLP

(57) ABSTRACT

A multidimensional addressing network for a power system comprising a number of substantially identical modules monitoring a plurality of surge suppressors. Each module may be uniquely selected or identified based at least in part on its physical relationship with the base plates and other modules.

2 Claims, 12 Drawing Sheets

PHYSICAL ADDRESSING FOR TRANSIENT VOLTAGE SURGE SUPPRESSOR MODULES

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

1. Field of the Invention

The inventions disclosed and taught herein relate generally to transient voltage surge suppressors; and more specifically relate to physically addressing power system modules for monitoring transient voltage surge suppressors.

2. Description of the Related Art

Many power systems, such as filters, transient voltage surge suppressors (TVSS) and uninterruptible power supplies (UPS), employ individual surge suppressors, such as metal oxide varistors (MOV), to protect the sensitive equipment they power. However, TVSS and their series fusing devices, such as MOVs, are at risk of failing due to the high current they shunt.

Therefore, such MOVs are often monitored. For example, U.S. Patent Application No. 20020024326 discloses a system that "includes: (a) in-parallel connection to an incoming power supply of a facility including a hot line and a neutral line, and at least one ground. There are components connected between the hot line and the neutral line in the following order: (b) front metal oxide varistor(s) line transient voltage surge suppressor having to suppress undesired power spikes; (c) at least one capacitor of predetermined capacitance; (d) at least two chokes in the form of inductor/metal oxide varistor transformers; (e) at least a second capacitor of its own predetermined capacitance; (f) back metal oxide varistor(S) [sic] having a predetermined capability. In preferred embodiments, the metal oxide varistor may be a plurality of varistors in parallel; (g) a failure indicator circuit connected to the transient voltage surge suppressor, including at least one relay, one voltage-surge responsive switch and one indicator signalling component." Abstract.

However, it may be helpful to determine which MOV needs to be replaced where several MOVs are used. To this end, U.S. Pat. No. 4,626,846 discloses "[a] bus arrangement for providing equipment units with an address is disclosed. Each individual equipment unit achieves its address automatically according to its relative physical position within the organization of the units without the need for setting any switches. In simplistic terms, this is achieved by providing at each unit, modification of the bus leads. This includes the termination of one lead, the addition of one lead, and the relative repositioning of the other leads." Abstract.

U.S. Pat. No. 5,065,154 discloses "a system comprising a plurality of digitally addressable electronic devices, all devices have the same construction and are designed for being connected in series to a common central monitoring station. The addressing of these devices is accomplished by a plurality of address lines which are connected to input contacts of the respective device. Within each device, a selection gate is connected to the input contacts which provides an enabling signal if the signal on said address lines has a predetermined bit pattern. Each device has output contacts connected to its input contacts to which the input contacts of a next device are connected. The address lines are connected from the input contacts to the output contacts of the device in such a way that the contacts are interchanged, and an inverter is inserted in one of said lines so that the bit pattern forming the address provided at the output contacts is different from the bit pattern received at the input contacts. Thus, along the system of series connected devices a plurality of different bit patterns is produced so that the position of the correct bit pattern to which the device selection means responds, is shifted along the series connected devices in order to address the device which is in a predetermined position. A preferred application of such devices is in medical surveillance systems in which a plurality of racks are connected serially together and to a center monitoring station, each rack being allocated to a different task and including the units which are needed to monitor the vital functions of a patient required for that task." Abstract.

U.S. Pat. No. 5,262,771 discloses "a method for addressing processor units of an equipment for monitoring and/or controlling, whereby a polling unit and processor units (6) provided with addresses exchange information, the processor units (6) are automatically addressed with the assistance of addressing telegrams in that an address contained in the addressing telegram is respectively incremented. The method can be advantageously used in equipment for in-service monitoring of equipment of communication transmission technology." Abstract.

U.S. Pat. No. 5,553,258 discloses "a method and apparatus for performing exchange transactions between caches and a main memory of a computer system, the caches and main memory being coupled to one another by a bus. The method includes the steps of providing caches of different sizes with a cache having a smallest size, and with each cache having an index fixed as a function of the size of the cache. For each exchange transaction, the number of bits of an index used to address a selected cache location are determined, and the upper bits of a memory address from a tag store location corresponding to the selected cache location are retrieved, where the retrieved upper address bits form an exchange address. In the event that the index of the selected cache location comprises more bits than the index of the cache having the fewest addressable locations, the excess bits of the index of the selected cache location are appended to the exchange address. The cache then transmits the exchange address, a memory read address, and exchange data to memory." Abstract.

U.S. Pat. No. 5,576,698 discloses "[a]n array of like system modules linked to a common control unit by connect lines, bussed and connected to all the modules by respective removable pin units so that each module address can be generated solely according to which said pin units are not connected." Abstract.

The inventions disclosed and taught herein are directed to an improved system for physically addressing modules for monitoring transient voltage surge suppressors.

BRIEF SUMMARY OF THE INVENTION

The present disclosure includes a multidimensional addressing network comprising a plurality of substantially identical modules. Each module may be uniquely selected or identified based at least in part on its physical relationship with the other modules.

The present disclosure also includes a power supply, and/or one or more surge cards, comprising a plurality of surge suppressors and a controller operable to check each surge suppressor's status using a multidimensional addressing network. The multidimensional addressing network may include a communications link connected to the controller, a number of substantially identical base plates connected in series, and a plurality of substantially identical modules, each monitoring a different one of the surge suppressors, or any combination thereof. Each module is uniquely addressable or identifiable according to its physical position relative to other modules.

The present disclosure further includes a power supply, and/or one or more surge cards, comprising a plurality of metal oxide varistors (MOV) and a controller operable to check each MOV's status using a multidimensional addressing network. The multidimensional addressing network may include a serial communications link connected to the controller, three identical base plates connected in series, and three groups of substantially identical modules, each monitoring a different one or more of the MOVs, or any combination thereof. Each base plate preferably includes at least three select lines and two address lines. Each group of modules are preferably connected in series to a different one of the base plates. Each module is uniquely addressable or identifiable according to its physical position relative to other modules.

DETAILED DESCRIPTION

Figure 1:
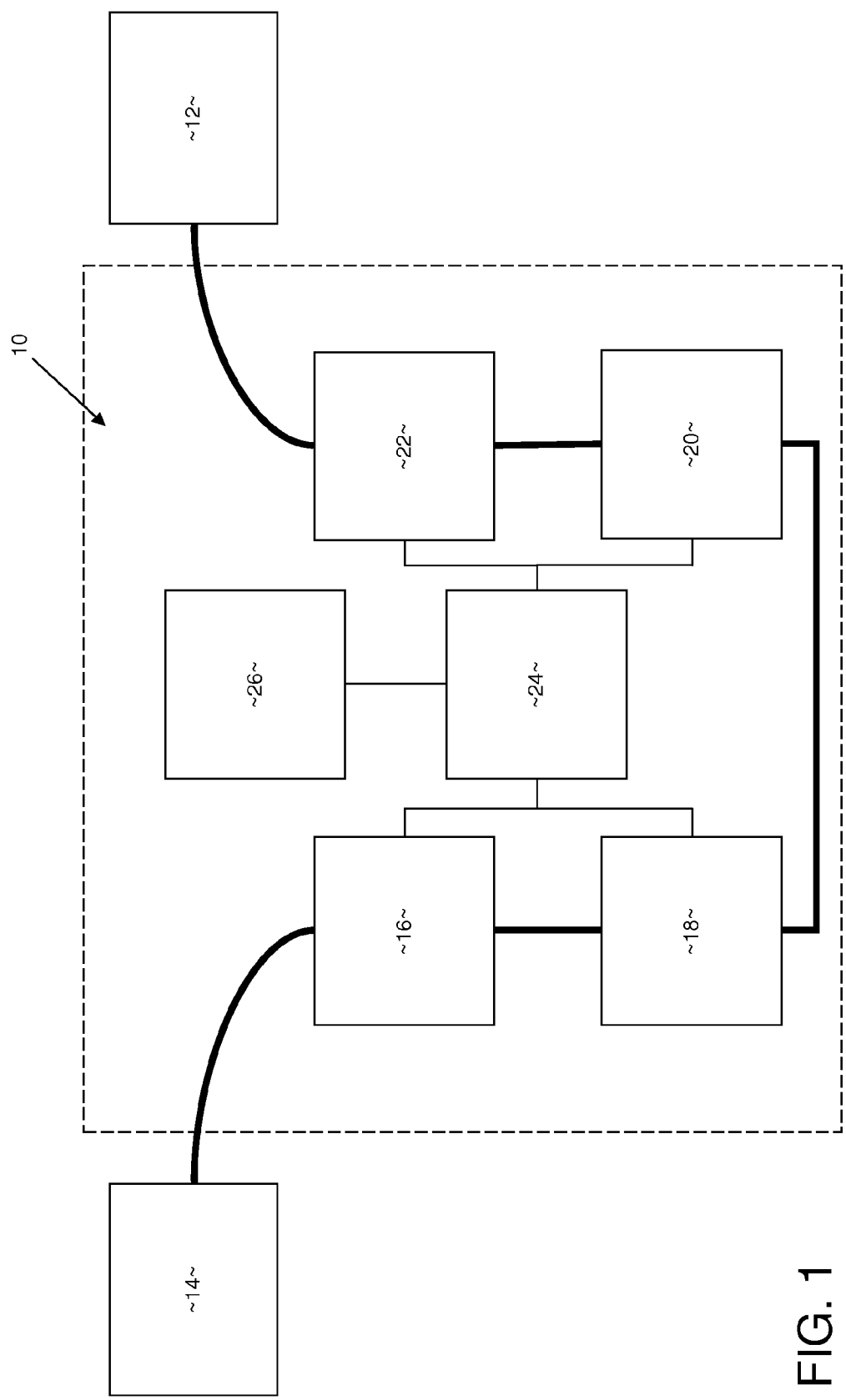
FIG. 1 illustrates a particular embodiment of a power system utilizing certain aspects of the present inventions.

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Particular embodiments of the invention may be described below with reference to block diagrams and/or operational illustrations of methods. It will be understood that each block of the block diagrams and/or operational illustrations, and combinations of blocks in the block diagrams and/or operational illustrations, can be implemented by analog and/or digital hardware, and/or computer program instructions. Such computer program instructions may be provided to a processor of a general-purpose computer, special purpose computer, ASIC, and/or other programmable data processing system. The executed instructions may create structures and functions for implementing the actions specified in the block diagrams and/or operational illustrations. In some alternate implementations, the functions/actions/structures noted in the Figures may occur out of the order noted in the block diagrams and/or operational illustrations. For example, two operations shown as occurring in succession, in fact, may be executed substantially concurrently or the operations may be executed in the reverse order, depending upon the functionality/acts/structure involved.

Computer programs for use with or by the embodiments disclosed herein may be written in an object oriented programming language, conventional procedural programming language, or lower-level code, such as assembly language and/or microcode. The program may be executed entirely on a single processor and/or across multiple processors, as a stand-alone software package or as part of another software package.

Applicants have created a power system using a multidimensional addressing network comprising a plurality of substantially identical modules to uniquely address each of a plurality of modules for monitoring a plurality of surge suppressors. Each module may be uniquely selected based at least in part on its physical relationship with the other modules.

FIG. 1 is an illustration of a power system 10 in accordance with an embodiment of the invention. The power system 10 controls power delivery to a load 12, such as sensitive computer equipment or the like. The power system 10 preferably receives power from a source 14, such as a conventional electrical utility. Such sources often experience power quality problems. For example, the source 14 may experience under-voltage conditions, such as sags, brownouts, and blackouts, as well as over-voltage conditions, such as transient voltage spikes or surges. Thus, the power system 10 may comprise an uninterruptible power supply (UPS) designed to deal with any power quality problems.

In one exemplary embodiment, the power system 10 may include an online uninterruptible power supply (UPS). In this case, the power system 10 preferably includes protection circuitry 16 to protect against potentially harmful power quality problems experienced by the source 14. An online UPS often includes a rectifier 18 to convert alternating current (AC) power from the source 14 to direct current (DC) power. The DC power is often supplied to a battery 20 for storage. The battery 20 has inherent capacitance, which helps protect against minor voltage fluctuations. The battery 20 also stores the power received from the source 14 for use when the source 14 experiences a major event, such as a total blackout. In that case, the battery 20 may actually supply power to the load 12. DC power from the source 14 not diverted to charge the battery 20, or from the battery 20 during a blackout, often supplies an inverter 22. The inverter 22 converts the DC power back into AC power to be supplied to the load 12.

It can be appreciated that if the source 14 fails, the battery 20 supplies the DC power to the inverter 22 and there is no interruption in power to the load 12. When the source 14 comes back online, the load 12 is again supplied from source 14 without any interruption in power. It can also be appreciated that the battery 20 and the inverter 22 may supply power that is inherently of higher quality than that to be expected from the source 14.

Whether the power system 10 includes the above described UPS components or not, the power system 10 preferably includes at least the protection circuitry 16 to protect the load 12 from potentially harmful power quality problems experienced by the source 14. The power system 10 also preferably includes a controller 24 for monitoring the components of the power system 10 and a user interface 26 to enable a user to monitor the power quality, the load 12, the source 14, the protection circuitry 16, and/or the other components of the power system 10.

Figure 2:
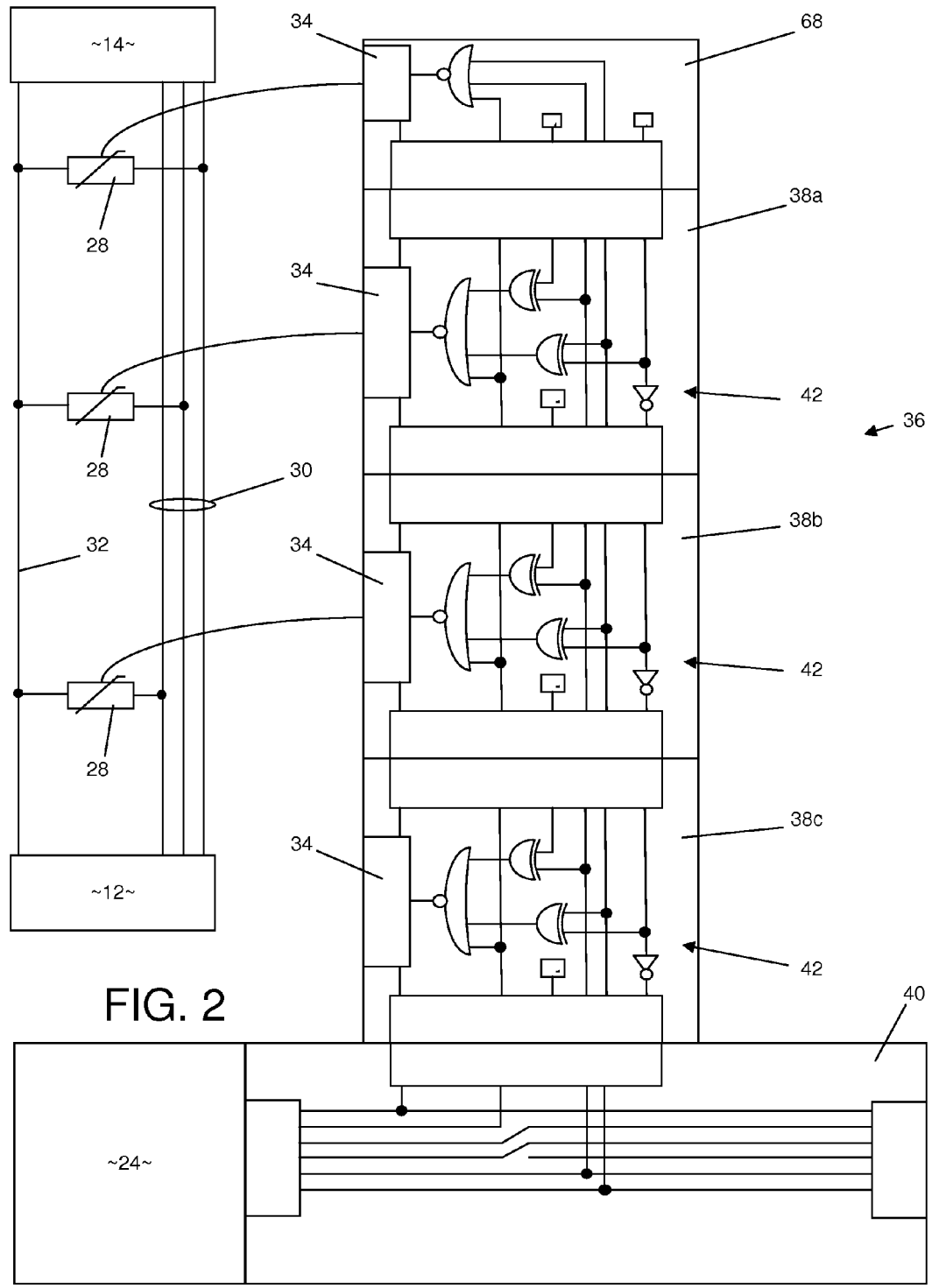
FIG. 2 illustrates certain aspects of an addressing network and other selected components of the power system of the present inventions.

Referring also to FIG. 2, the protection circuitry 16 preferably includes at least one transient voltage surge suppressor 28, such as a metal oxide varistor (MOV), connected between a hot, or positive, line 30 and a neutral line 32 and located between the source 14 and the load 12. There may be one or more MOVs 28 between the hot line 30 and neutral 32. For example, where the source 14 supplies three phase power, there may be an MOV 28 connected between each hot leg 30 and the neutral 32 and/or ground. Alternatively, there may be an array of MOVs 28 between each hot leg 30 and the neutral 32. The MOVs 28 may be connected in parallel, in series, or some combination thereof. Additionally, the MOVs 28 may be connected between the hot legs 30 themselves, either singly or in one or more arrays. Finally, the MOVs 28 may be connected between the neutral 32 and ground.

The MOVs 28, or their series fusing elements, sometimes fail and need to be replaced after exposure to a transient voltage surge or other potentially harmful event. Therefore, the controller 24 preferably monitors the status of each MOV 28. When any MOV 28 trips, or fails, the controller 24 notifies the user through the user interface 26, such as by illuminating or changing the color of a light emitting diode (LED) of the user interface 26.

The controller 24 is preferably in communication with a plurality of individual monitoring circuits 34, where each monitoring circuit 34 is paired to monitor a different one, or group, of the MOVs 28, through an addressing system or network 36. The controller 24 preferably checks the status of each MOV 28, or group of MOVs 28, by individually, or uniquely, selecting each monitoring circuit 34, thereby prompting each monitoring circuit 34 to report the status of the corresponding MOV 28, or group of MOVs 28. For example, the controller 24 may sequentially checks the status of each MOV 28, or group of MOVs 28. The monitoring circuits 34 may comprise a simple resistance bridge with or without a rectifier. Alternatively, the monitoring circuits 34 may be more sophisticated, operable to provide digital data concerning the status of each MOV 28.

Each monitoring circuit 34 is preferably integrated into a monitoring module 38 (see FIG. 3), which is coupled with the controller 24 through one or more base plates 40. In order to simplify production and assembly of the power system 10, the modules 38 and base plates 40 are preferably identical to one another. The modules 38 and base plates 40 preferably have no jumpers or switches to set, nor require any other configuration beyond electrical connection to their respective MOVs 28 and physical integration into the network 36.

Figure 3:
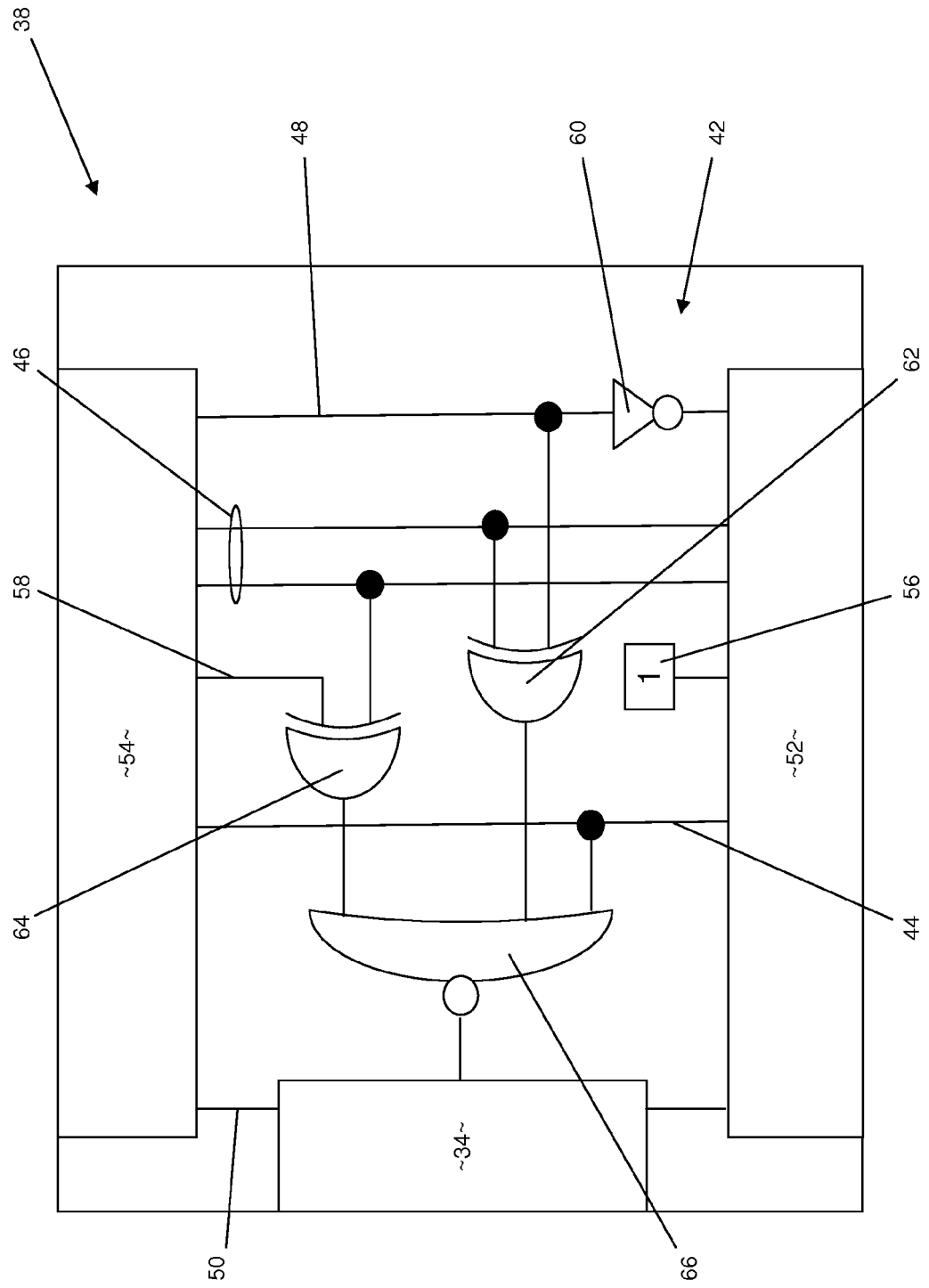
FIG. 3 illustrates a first embodiment of a module of the addressing network.

Instead, referring also to FIG. 3, the modules 38 preferably include physical addressing logic 42, enabling the controller 24 to individually select each module 38 in order to check or monitor the status of each MOV 28. Each module 38 is selected through the logic 42, one or more select lines 44, one or more address lines 46, and one or more logic lines 48. When selected, the module's logic 42 triggers the monitoring circuit 34 to provide the status information or data to one or more data lines 50. The lines 44,46,48,50 run through the module 38, between a bottom electrical connector 52 and a top electrical connector 54. The data line 50 additionally preferably runs through the monitoring circuit 34, thereby providing a communications link from each monitoring circuit 34 to the controller 24.

As will be described in greater detail below, the modules 38 are designed to be stacked one on top of the other. The bottom connecter 52 of one module 38 is designed to couple with the top connector 54 of another module 38. In this manner, the lines 44,46,48,50 are passed from one module 38 to another module 38. It can also be appreciated that lower modules 38 may physically support upper modules 38.

Each module 38 also preferably includes an output 56 and an input 58. The output 56 is preferably a positive voltage output, representing a logical "on" state, and is provided to a lower module, as the input 58 thereto, through the connectors 52,54. In other words, the input 58 is provided through its top connector 54 when an upper module provides the output 56 to its bottom connector 52. Thus, on lower modules the input 58 will represent a logical "on" state. On an uppermost module the input 58 may be floating. However, in the preferred embodiment, the input 58 of any uppermost module is preferably held low, representing a logical "off" state. This may be accomplished in a number of ways, such as by being connected to ground through a high impedance element.

The logic line 48 preferably includes an integrated inverter 60, which inverts its logical state from an "on" state to an "off" state, or vice versa. For example, where the logic line 48 enters the module 38 in an "on" state, through the top connector 54, the inverter 60 inverts it to an "off" state before the logic line 48 leaves the module 38, through the bottom connector 52. Alternatively, where the logic line 48 enters the module 38 in an "off" state, through the top connector 54, the inverter 60 inverts it to an "on" state before the logic line 48 leaves the module 38, through the bottom connector 52. In this manner, the state of the logic line 48 is alternated, with both states occurring on each module 38.

Because the logic line 48 is preferably provided to a lower module 38 by an upper module 28, the entry state of the logic line 48 may be floating on an uppermost module 38. However, in the preferred embodiment, the entry state of the logic line 48 of an uppermost module 38 is preferably held high, representing a logical "on" state. This may be accomplished in a number of ways, such as by being connected to five volts through a high impedance element. Because the modules 38 are preferably identical, the manner in which these initial or default states of the logic line 48 and input 58 are accomplished are designed to not interfere with the logic line 48 and input 58 actually generated by other modules 38.

The entry state of the logic line 48 is fed to a first exclusive OR (XOR) gate 62. Additionally, a first one of the address lines 46 is fed to the first XOR gate 62. A second one of the address lines 46 is fed to a second XOR gate 64. The input 58 is also fed to the second XOR gate 64. The outputs of the XOR gates 62,64 are fed to an inverted output OR (NOR) gate 66. The select line 44 is also fed to the NOR gate 66. The inverted output of the NOR gate 66 selects, or effectively triggers, the monitoring circuit 34, thereby instructing the monitoring circuit 34 to place the status information relating to the monitored MOV 28 onto the data line(s) 50.

Figure 4:
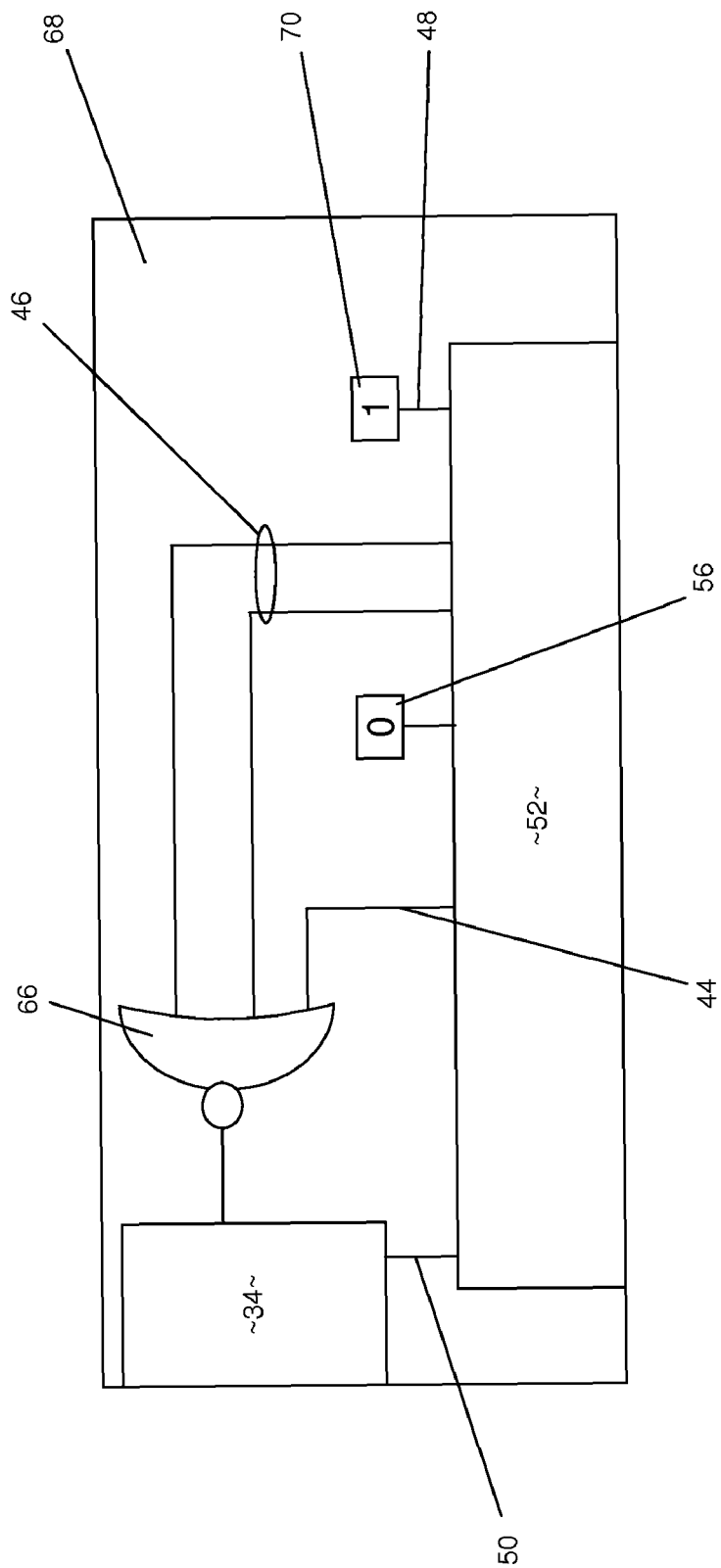
FIG. 4 illustrates a second embodiment of a module of the addressing network.

While each module 38 is preferably identical, or at least substantially identical, referring also to FIG. 4, a top module 68 may be simplified. For example, because it rests atop a stack of modules 38, the top module 68 does not need the top connector 54 or much of the logic 42. The top module 68 may include only the monitoring circuit 34, the select line(s) 44, the address lines 46, the data line(s) 50, the bottom connector 52, the output 56, and the NOR gate 62. However, in the top module 68, in at least one embodiment, the output 56 can be initiated at a zero voltage, representing a logical "off" state, and is provided to a lower module through the bottom connector 52. The top module 68 also preferably initiates the logic line 48 through a logic line output 70. The logic line 48 is preferably initially set high, in the logical "on" state, and is provided to a lower module through the bottom connector 52.

Each module 38 can include one select line 44, two address lines 46, one logic line 48, and one data line 50. Because, in this embodiment, there is only one data line 50, the monitoring circuit 34 can generate an analog reading, a single status bit, or status data in a serial format. Each module 38 also can include one inverter 56, two XOR gates 62,64, and one NOR gate 66. This allows three modules 38 and one top module 68 to be stacked on each base plate 40. Adding an additional address line 46 would double that capacity, allowing up to eight modules 38,68 to be stacked on each base plate 40. Similarly, using a single address line 46 would allow two modules 38,68 to be stacked on each base plate 40. Of course, more or less logic 42 would also be required, depending on the number of modules 38,68 desired.

It will be appreciated that the output of a XOR gate is set to a logical "on" state when one and only one of its inputs are set to a logical "on" state. It will also be appreciated that the output of a NOR gate is set to a logical "on" state when none of its inputs are set to a logical "on" state.

Thus, referring now to FIGS. 2 and 4, when and only when the select line 44 and both the address lines 46 are all low, in the logical "off" state, the output of the NOR gate 66 of the top module 68 will trigger the monitoring circuit 34 to provide the status information relating to the MOV 28 monitored by the monitoring circuit 34 of the top module 68 to the data line 50. This example represents an address of "00" and selects the top module 68 in the example of FIG. 2.

Referring now to FIGS. 2 and 3, when both the first address line 46 and the entry status of the logic line 48 are high, in the logical "on" state, the output of the first XOR gate 62 will be low, in the logical "off" state. When both the second address line 46 and the input 58 are low, in the logical "off" state, the output of the second XOR gate 64 will be low, in the logical "off" state. Thus, when the status line 44 and the output of both XOR gates 62,64 are low, in the logical "off" state, the output of the NOR gate 66 of the module 38a will trigger the monitoring circuit 34 to provide the status information relating to the MOV 28 monitored by the monitoring circuit 34 of the module 38a to the data line 50. This example represents an address of "01" and selects module 38a in the example of FIG. 2.

When both the first address line 46 and the entry status of the logic line 48 are low, in the logical "off" state, the output of the first XOR gate 62 will be low, in the logical "off" state. When both the second address line 46 and the input 58 are high, in the logical "on" state, the output of the second XOR gate 64 will be low, in the logical "off" state. Thus, when the status line 44 and the output of both XOR gates 62,64 are low, in the logical "off" state, the output of the NOR gate 66 of the module 38b will trigger the monitoring circuit 34 to provide the status information relating to the MOV 28 monitored by the monitoring circuit 34 of the module 38b to the data line 50. This example represents an address of "10" and selects module 38b in the example of FIG. 2.

When both the address lines 46, the entry status of the logic line 48, and the input 58 are all high, in the logical "on" state, the output of both XOR gates 62,64 will be low, in the logical "off" state. Thus, when the status line 44 and the output of both XOR gates 62,64 are low, in the logical "off" state, the output of the NOR gate 66 of the module 38c will trigger the monitoring circuit 34 to provide the status information relating to the MOV 28 monitored by the monitoring circuit 34 of the module 38c to the data line 50. This example represents an address of "11" and selects module 38c in the example of FIG. 2.

It can be appreciated that the controller 24 may control the address lines 46 in order to select the desired module 38, and therefore determine the status of the desired MOV 28. However, it can also be appreciated that the controller 24 has no control over the logic line 48 or the input 58. In at least one embodiment, these are exclusively controlled by the position of each module 38 in the stack. For example, the top module 68 sets the logic line 48 high, in the "on" state, and the output 56 low, in the "off" state. As these are the states in which module 38a, immediately under the top module 68, receives the logic line 48 and the input 58, the controller 24 must set the first address line 46 high, to match the high logic line 48, and the second address line 46 low, to match the low input 58, in order to select module 38a.

Each module 38 provides the output 56 high, logically "on", and inverts the logic line 48. Therefore, the next lower module 38b will receive the logic line 48 low and the input 58 high. Thus, the controller 24 must set the first address line 46 low, to match the low logic line 48, and the second address line 46 high, to match the high input 58, in order to select module 38b. Continuing, the next lower module 38c will receive the logic line 48 high and the input 58 high. Thus, the controller 24 must set both address lines 46 high, to match both the logic line 48 and the input 58, in order to select module 38c. A summary of the addressing scheme for the particular embodiment discussed above is provided in Table 1 below, where the modules 38,68 are listed in descending order from top to the bottom of the stack.

TABLE 1

| Selectable Address Lines | | Position-dependent Address Lines | | Module Status | | | |
|---|---|---|---|---|---|---|---|
| Line 2 | Line 1 | Logic | Input | Module 1 | Module 2 | Module 3 | Module 4 |
| 0 | 0 | X | X | ON | OFF | OFF | OFF |
| 0 | 1 | 1 | 0 | OFF | ON | OFF | OFF |
| 1 | 0 | 0 | 1 | OFF | OFF | ON | OFF |
| 1 | 1 | 1 | 1 | OFF | OFF | OFF | ON |

It can therefore be seen that the physical location, or order, of each module 38 on the stack allows the controller 24 to individually select each module 38,68. Thus, the modules 38 may be identical, relying on their physical location, or order, in the stack to aid the controller 24 in differentiating between them. While the preferred embodiment of the present invention envisions use of a top module 68 atop a stack of modules 38, the top module 68 is not required. For example, as discussed above, the logic line 48 and input 56 may float, without the top module 68, but are preferably held high and low, respectively, through high impedance connections to positive five volts and ground, respectively. Thus, all modules 38 in a stack may be exactly identical. In any case, the modules 38 below the top module 68, if the top module 68 is used, are preferably identical.

It can also be seen that a stack of modules 38 is only selected when the corresponding select line 44 is pulled low by the controller 24. Each base plate 40 supports a stack of modules 38,68 and provides the lines 44,46 thereto. Thus, the lower most, or bottom, module 38c receives the select line 44 from the base plate 40, through the bottom connector 52.

Figure 5:
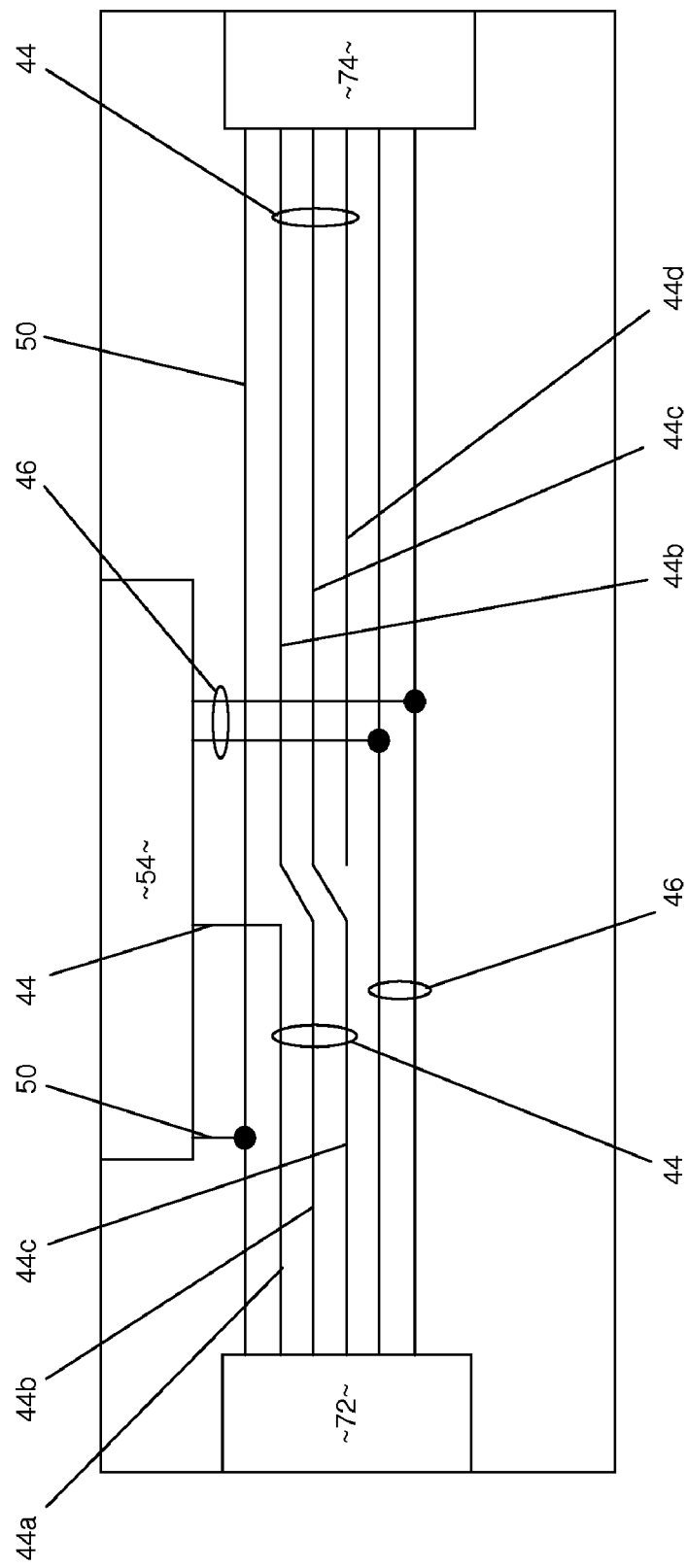
FIG. 5 illustrates an embodiment of a base plate of the addressing network.

Referring also to FIG. 5, each base plate 40 is also preferably identical and preferably includes a top electrical connector 54, which couples with the bottom electrical connector 52 of the lower most module 38,38c. The base plate 40 also preferably includes a left electrical connector 72 and a right electrical connector 74, between which a plurality of select lines 44 and the address lines 46 pass. The address lines 46 of the base plate 40 preferably directly correspond with the addressed lines 46 of the modules 38,68.

However, only one of the base plate's 40 select lines 44 corresponds with the select line 44 of the modules 38,68. In a preferred embodiment, first, second, and third select lines 44a,44b,44c enter the base plate 40 on the left, through the left connector 72. Of those, only the second and third select lines 44b,44c exit the base plate 40 on the right, through the right connector 74, albeit shifted in position. The first select line 44a becomes the select line 44 fed to the modules 38,68 coupled to the top connector 54. The remaining select lines 44b,44c are preferably shifted on the base plate 40, such that the second select line 44b replaces the first select line 44a and exits the base plate 40 in the position of the first select line 44a. Similarly, the third select line 44c replaces the second select line 44b and exits the base plate 40 in the position of the second select line 44b.

Figure 6:
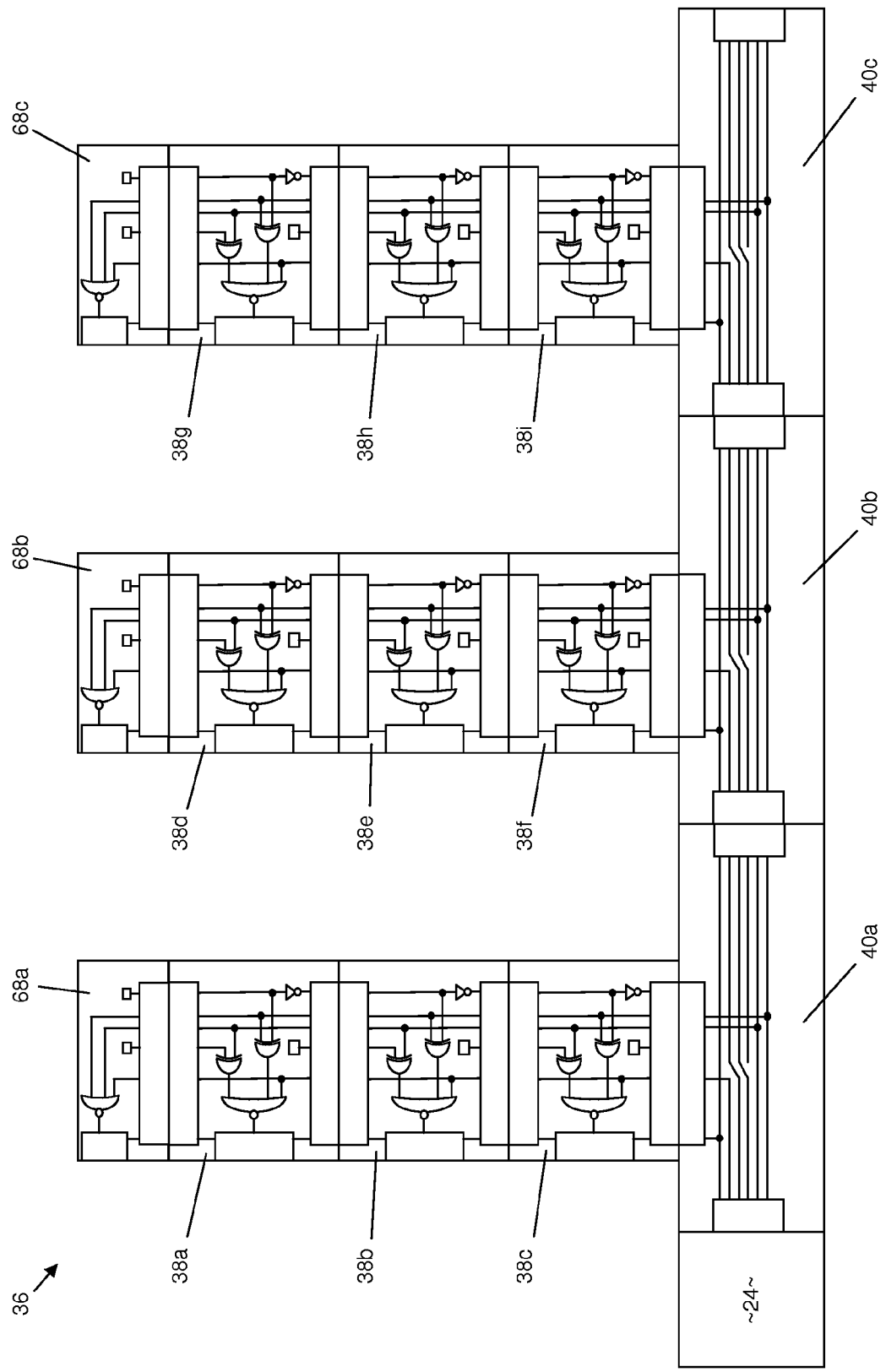
FIG. 6 illustrates a preferred embodiment of the addressing network.

Referring also to FIG. 6, in a preferred embodiment, the network 36 of the present invention allows the controller 24 to select any one of twelve monitoring circuits 34, and receive the status information relating to any one of twelve corresponding monitored MOVs 28, using three select lines 44 and two address lines 46.

To select a first base plate 40a and corresponding modules 38,68, the controller 24 sets the first select line 44a low while holding the other select lines 44b,44c high. The first select line 44a is fed to the modules 38,68 connected to the first base plate 40a, thereby selecting that stack of modules 38,68. To select a second base plate 40b, the controller 24 sets the second select line 44b low while holding the other select lines 44a,44c high. The second select line 44b is fed through and shifted on the first base plate 40a. The second base plate 40b receives the low select line in the position of the first select line 44a and feeds that to the modules 38,68 connected to the second base plate 40b, thereby selecting that stack of modules 38,68. To select a third base plate 40c, the controller 24 sets the third select line 44c low while holding the other select lines 44a,44b high. The third select line 44c is fed through and shifted on the first base plate 40a. The second base plate 40b receives the low select line in the position of the second select line 44b, shifts it to the position of the first select line 44a and feeds that to the third base plate 40c. The third base plate 40c receives the low select line in the position of the first select line 44a and feeds that to the modules 38,68 connected to the third base plate 40c, thereby selecting that stack of modules 38,68. In this manner, the controller 24 may select any one of three base plates 40, and the modules 38,68 coupled thereto, using the select lines 44 and the physical location, or order, of the base plates 40.

It can be seen that only the second and third select lines 44b,44c exit the base plate 40 through the right connector 74, albeit in the first and second positions. The third position is filled by a virtual select line 44d. The virtual select line 44d may be floating. However, in the preferred embodiment, the virtual select line 44d of each base plate 40 module is preferably held high, representing a logical "on" state. This may be accomplished in a number of ways, such as by being connected to a positive voltage through a high impedance element. In this manner, subsequent base plates 40, beyond the capacity enabled by the number of select lines 44, automatically pass select lines 44 to corresponding modules 38,68 in a logical "on" state, thereby preventing such extra modules from transmitting on the data line(s) 50.

The required line settings from the controller 24 will now be described in detail. In order to select a first top module 68a, the controller 24 must set the first select line 44a low, the remaining select lines 44b,44c high, and both address lines 46 low. In order to select the first module 38a, the controller 24 must set the first select line 44a low, the remaining select lines 44b,44c high, the first address line 46 high, and the second address line 46 low. In order to select the second module 38b, the controller 24 must set the first select line 44a low, the remaining select lines 44b,44c high, the first address line 46 low, and the second address line 46 high. In order to select the third module 38c the controller 24 must set the first select line 44a low, the remaining select lines 44b,44c high, and both address lines 46 high.

In order to select a second top module 68b, the controller 24 must set the second select line 44b low, the remaining select lines 44a,44c high, and both address lines 46 low. In order to select a fourth module 38d the controller 24 must set the second select line 44b low, the remaining select lines 44a,44c high, the first address line 46 high, and the second address line 46 low. In order to select a fifth module 38e, the controller 24 must set the second select line 44b low, the remaining select lines 44a,44c high, the first address line 46 low, and the second address line 46 high. In order to select a sixth module 38f, the controller 24 must set the second select line 44b low, the remaining select lines 44a,44c high, and both address lines 46 high.

In order to select a third top module 68c, the controller 24 must set the third select line 44c low, the remaining select lines 44a,44b high, and both address lines 46 low. In order to select a seventh module 38g, the controller 24 must set the third select line 44c low, the remaining select lines 44a,44b high, the first address line 46 high, and the second address line 46 low. In order to select an eighth module 38h, the controller 24 must set the third select line 44c low, the remaining select lines 44a,44b high, the first address line 46 low, and the second address line 46 high. In order to select a ninth module 38i, the controller 24 must set the third select line 44c low, the remaining select lines 44a,44b high, and both address lines 46 high.

Figure 7:
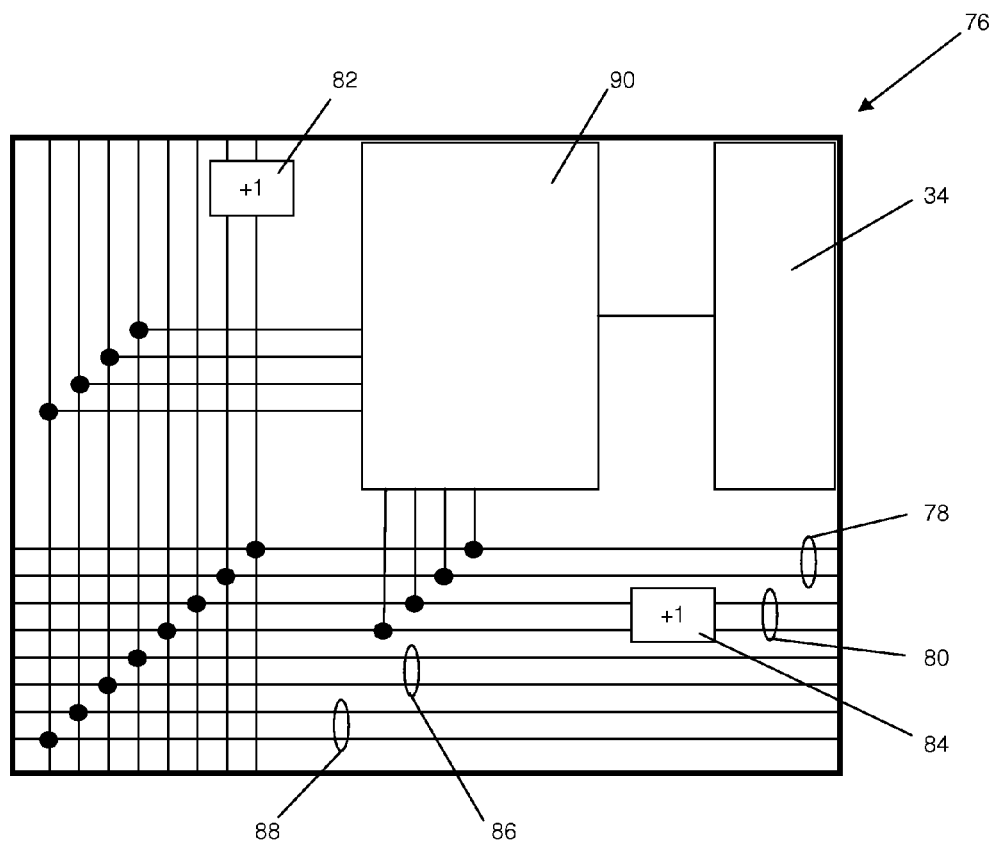
FIG. 7 illustrates a third embodiment of a module of the addressing network utilizing certain aspects of the present inventions.
Figure 8:
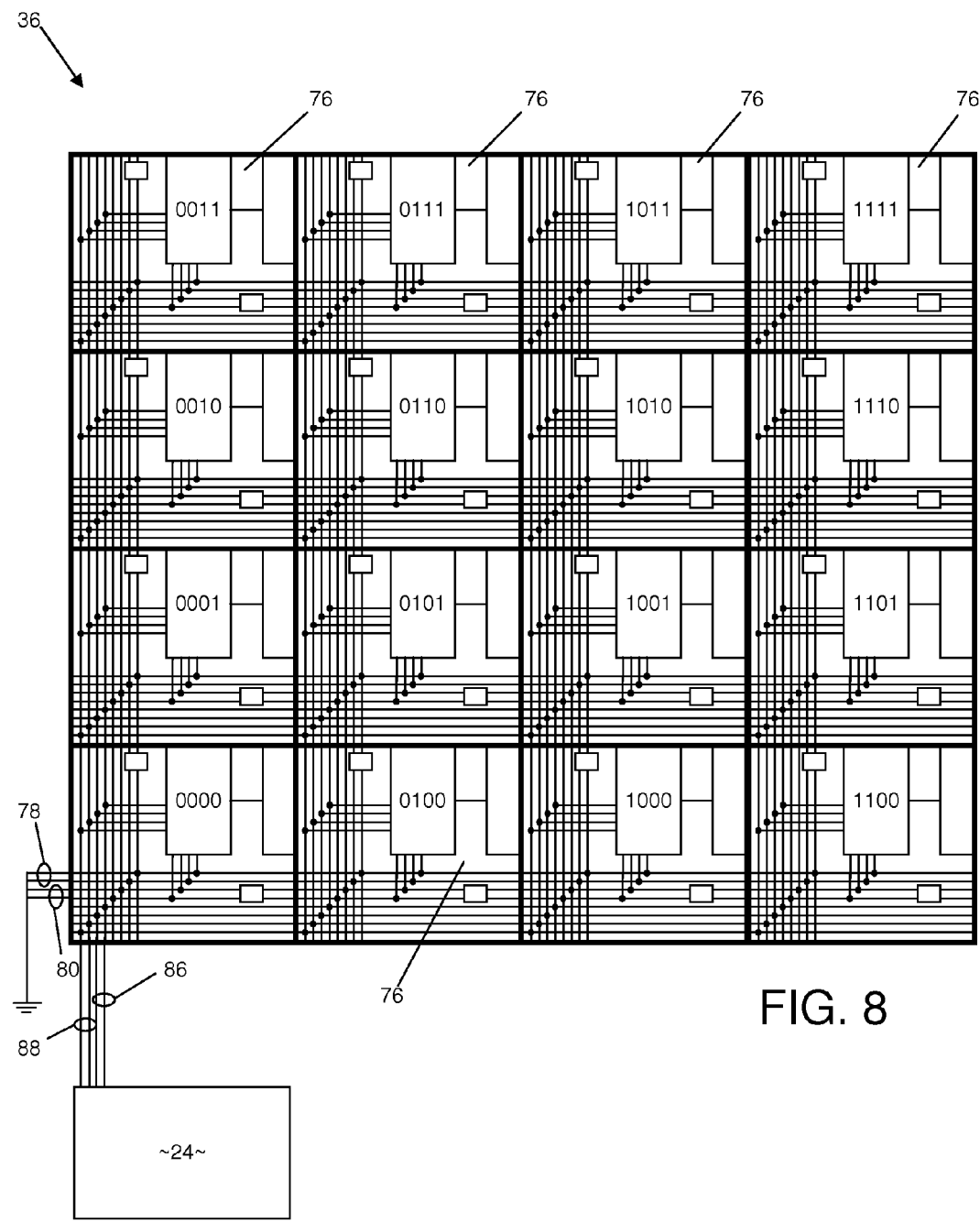
FIG. 8 illustrates an alternative preferred embodiment of the addressing network utilizing certain aspects of the present inventions.

Referring also to FIGS. 7 and 8, an alternative embodiment of the present invention is shown. An alternative embodiment of the module 76 includes the monitoring circuit 34 to provide the status information relating to the MOV 28 monitored by the monitoring circuit 34 of the module 76 to the data lines (not shown). The module 76 includes a number of position dependant row address lines 78 and a number of position dependant column address lines 80. In the preferred alternative embodiment, the module 76 includes two position dependant row address lines 78 and two of position dependant column address lines 80. Thus, using binary numbering, the preferred alternative embodiment of the addressing system or network 36 can accommodate four rows and four columns, for a total of sixteen modules 76 with only four address lines.

Before leaving each module 76, the binary number encoded on the position dependant row address lines 78 is incremented by a row increment circuit 82. Likewise, the binary number encoded on the position dependant column address lines 80 is incremented by a column increment circuit 84. The increment circuits are preferable identical and simply adjust the position dependant address lines 78,80, such that the binary numbers represented thereon are incremented. This functionality automatically assigns a different address to each module 76 based on its physical relationship with the other modules 76.

More specifically, the controller 24 selects a specific one of the modules 76 using a corresponding number of row select address lines 86 and column select address lines 88. As can be seen, all of the address lines 78,80,86,88 are communicated across each row and each column of the network 36. A decoding circuit 90 on each module 76 attempts to match the position dependant address lines 78,80 with the select address lines 86,88. If the position dependant address lines 78,80 match the select address lines 86,88, the decoding circuit 90 triggers the monitoring circuit 34 to provide the status information or data to one or more data lines (not shown). In this manner, the controller 24 may individually or uniquely select each module 76 by manipulation of the select address lines 86,88.

It should be understood that the modules 38,68 and base plates 40 may and likely do include additional components, features and capabilities. For example, while not explicitly described, the logic 42 of the modules 38,68 requires a source of power to function and therefore include both a positive and negative or ground power connection. Furthermore, while the data line 50 of the preferred embodiment has been described as a single line, it almost certainly requires a reference ground. This ground may be the same as the power connection ground. These additional connections may be supplied through the base plates 40 or some other source.

Figure 9:
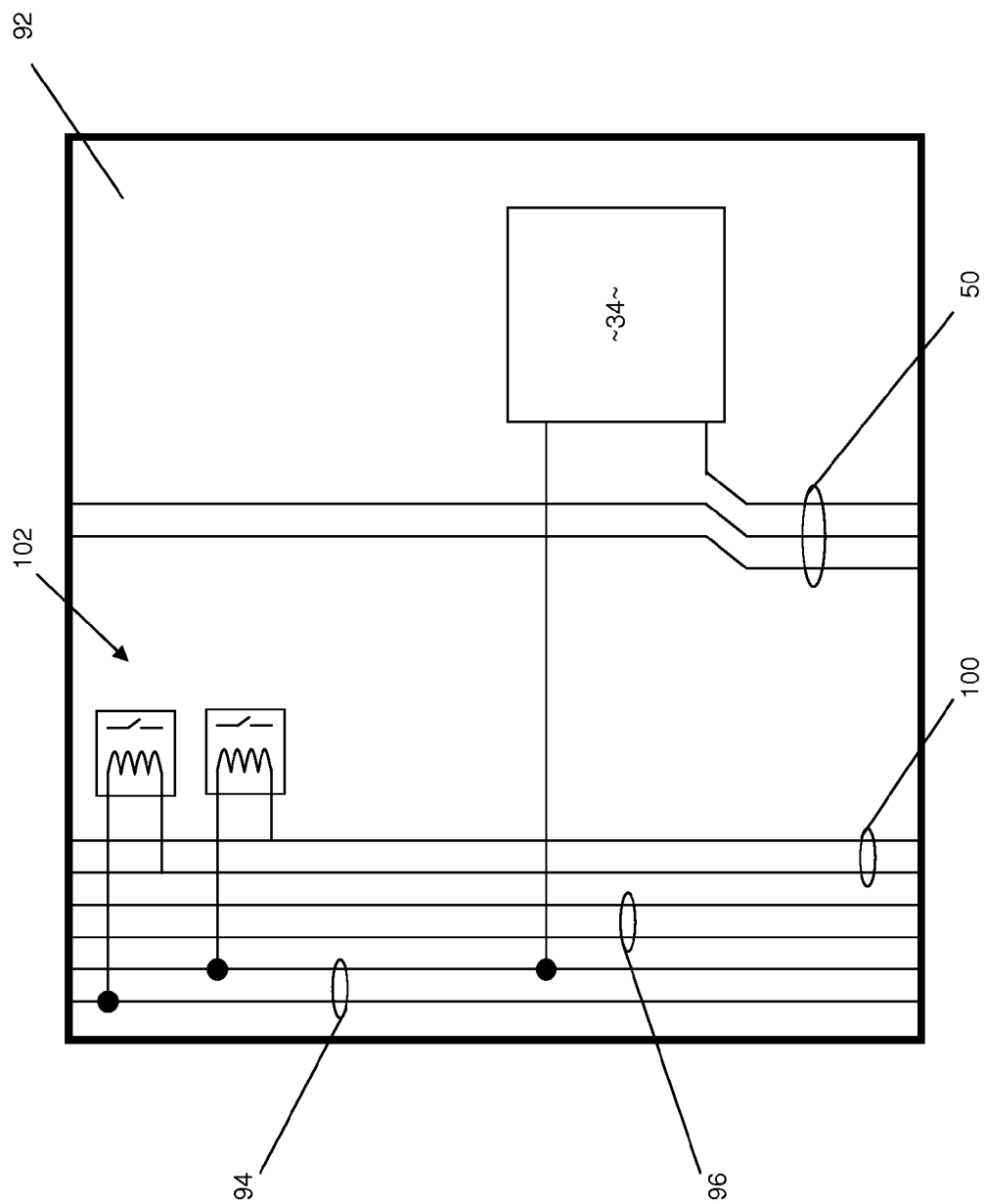
FIG. 9 illustrates a fourth embodiment of a module of the addressing network utilizing certain aspects of the present inventions.
Figure 10:
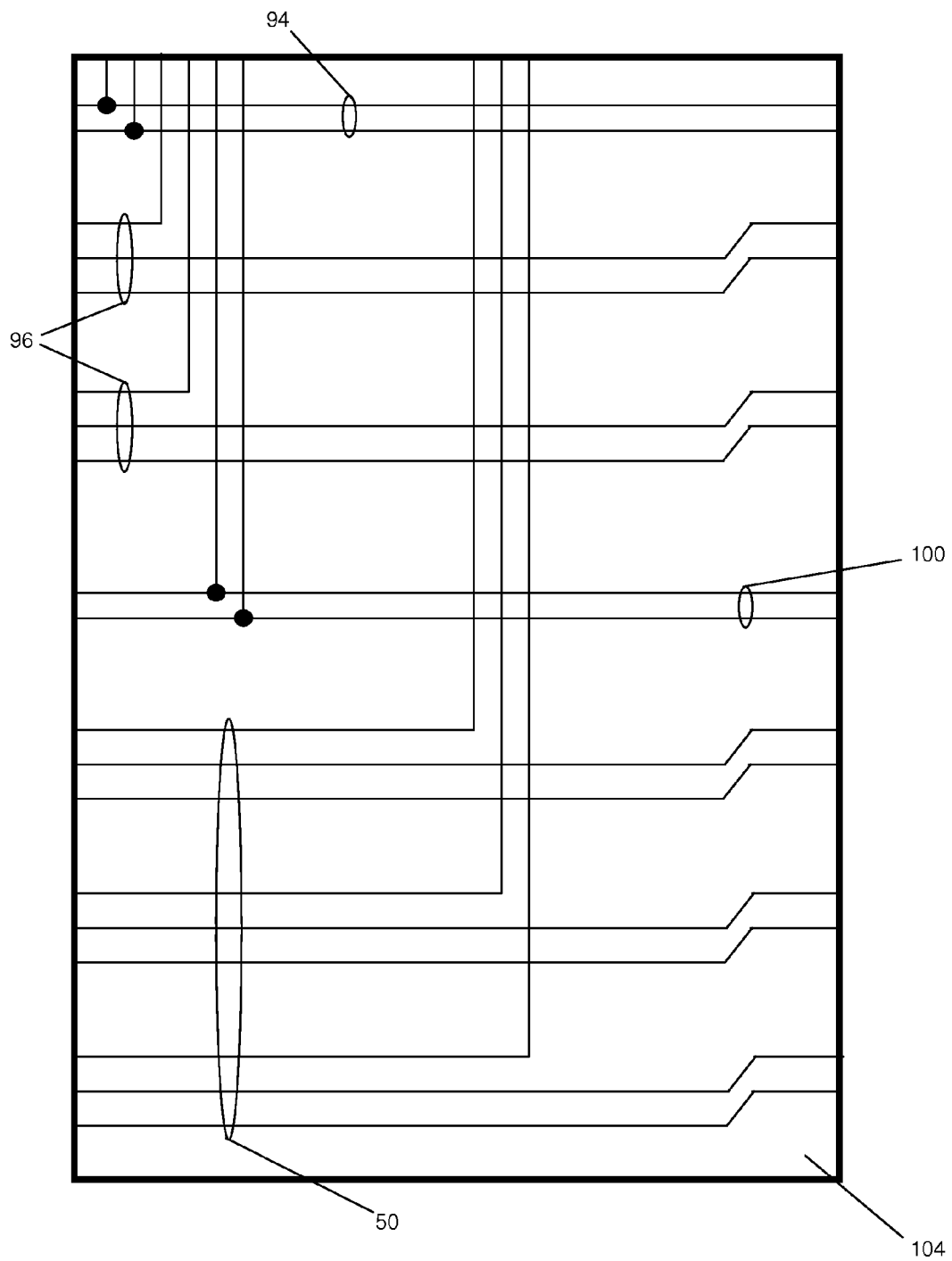
FIG. 10 illustrates a second embodiment of a base plate of the addressing network.
Figure 11:
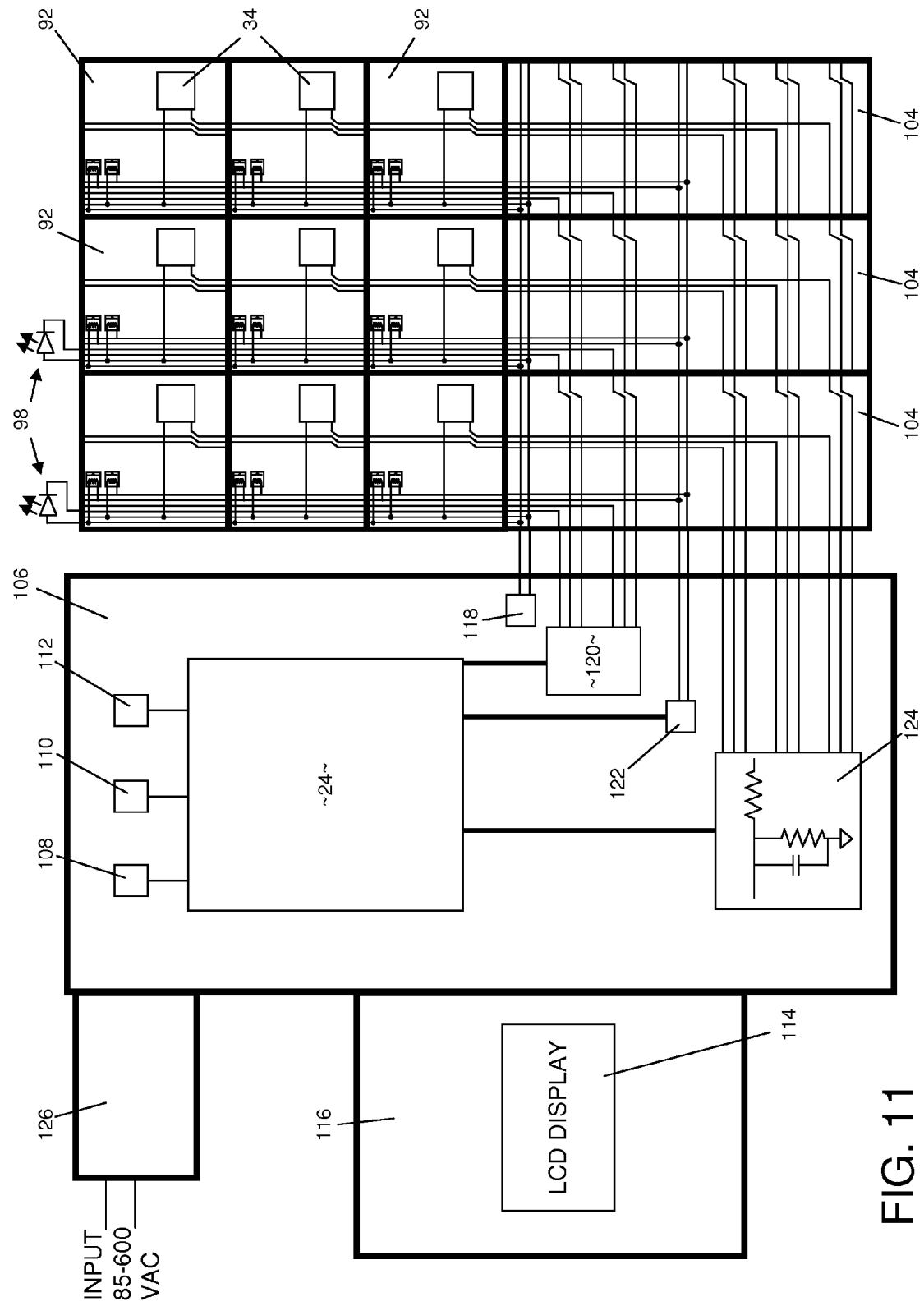
FIG. 11 illustrates another alternative preferred embodiment of the addressing network utilizing certain aspects of the present inventions.

Referring also to FIGS. 9, 10, and 11, still another alternative embodiment of the present invention is shown. In this embodiment, addressing schemes may be simplified. For example, rather than actually individually addressing each module, such as through the use of the address lines, the network 36 may simply continuously, substantially continuously, or periodically, communicate the status information of all MOVs 28, or groups of MOVs 28. For example, as best shown in FIG. 9, this embodiment of the module 92 includes the monitoring circuit 34 to provide the status information relating to the MOV 28, or group of MOVs 28, monitored by the monitoring circuit 34 of the module 92 to the data lines 50.

This, or any other, embodiment of the module 92 may include one or more power lines 94 to provide power to the circuitry thereon and/or external devices. In one embodiment, the power lines 94 provide five volts DC. This, or any other, embodiment of the module 92 may also include one or more indicator lines 96 to control indicators, such as light emitting diodes (LEDs) 98, as shown in FIG. 11. Each stack, or column, of modules 92 may connect to one, as shown, two, or more LEDs 98. This, or any other, embodiment of the module 92 may also include one or more relay lines 100 to control relays 102 providing additional control functionality.

It can be seen that the data lines 50 shift onboard each module 92. In this manner, a first one of the data lines 50 (first from the right in this case) corresponds to the monitoring circuit 34 on a first one of the modules 92 (a bottom module in this case). A second one of the data lines 50 corresponds to the monitoring circuit 34 on a second one of the modules 92 immediately above the first module 92, as the data lines 50 on the first, or bottom, module 92 are shifted over such that the second one of the data lines 50 is shifted to the position of the first one of the data lines 50. Likewise, a third one of the data lines 50 corresponds to the monitoring circuit 34 on a third one of the modules 92 immediately above the second module 92, as the data lines 50 on the first and second modules 92 are shifted over such that the third one of the data lines 50, with respect to the first module 92, is shifted to the position of the first one of the data lines 50, with respect to the third module 92. In this, or any other, embodiment of the module 92, the remaining lines may pass through without being shifted.

As best shown in FIG. 10, this, or any other, embodiment of the base plate 104 may pass the power lines 94 and the relay lines 100 through to an adjacent base plate 104. This, or any other, embodiment of the base plate 104 may also communicate the power lines 94 and the relay lines 100 to the modules 92 connected thereto. Additionally, this, or any other, embodiment of the base plate 104 may communicate the indicator lines 96 and the data lines 50 to the modules 92 connected thereto, while shifting the indicator lines 96 and the data lines 50, so that each stack or column of the modules 92 may be uniquely identified. Thus, the controller 24 may individually control the LEDs 98 of each stack, or column, of modules 92. As shown in this embodiment, the controller 24 may continuously receive the status information from each and every monitoring circuit 34 of the modules 92.

Thus, rather than selecting a module of interest, such as through addressing lines, the controller 24 can distinguish between monitoring circuits 34, and thus MOVs 28, by which data line 50 the desired status information is received on. More specifically, due to the shifting of the data lines 50 on the base plate 103 and the modules 92, each monitoring circuit 34 corresponds to a different one of the data lines, according to that module's 92 position in the network 36.

As best shown in FIG. 11, the controller 24 itself may form a portion of a control board 106. The control board 106 may include additional circuitry to support the system 10. For example, in some embodiments, the control board 106 may include a temperature sensor 108, a real time clock 110, a programmable flash memory 112, or any combination thereof. These components may directly support the controller 24 and/or provide additional data to the controller 24 for storage and/or communication. For example, time and temperature information may be displayed on a display 114, which may be mounted on a distinct user interface board 116 along with additional input/output devices.

The control board 106 may also include an onboard power source 118, such as to power the power lines 94. The control board 106 may also include a LED driver 120 to drive the LEDs 98. The control board 106 may also include a relay driver 122 to drive the relays 102. The control board 106 may also include data conditioning circuitry 124 to convert, condition, stabilize, or otherwise assist the controller 24 in reading the status information on the data lines 50. Finally, the control board 106 may be powered by an onboard, or distinct, power supply 126. The power supply 126 may include a standard universal input power supply, such as one that accepts 85-264 VAC and provides a 5 VDC output. In some embodiments, the power supply 126 may also include a voltage extender, such as that disclosed in U.S. patent application Ser. No. 12/634,920, which is incorporated herein by specific reference.

It can be seen that the modules 38,68,76,92 and base plates 40,104, themselves, form a multidimensional network, or array. In that array, each modules' 38,68,76,92 position relative to other modules 38,68,76,92 and base plates 40,104 automatically defines a unique address, through which the controller 24 can uniquely select or identify each module 38,68,76,92, and thereby selectively receive or identify status information about each MOV 28 monitored by the monitoring circuit 34 of the selected module 38,68,76,92. In some embodiments, this unique addressing may allow the controller 24 to uniquely identify each module 38,68,76,92, and thereby uniquely identify status information about each MOV 28 monitored by the monitoring circuit 34 of the desired module 38,68,76,92 according to the appropriate data line 50 corresponding to that module's 92 position in the array. It can be seen that this requires no configuration of the modules 38,68,76,92 other than physically integrating them into the network, or array, 36.

Figure 12:
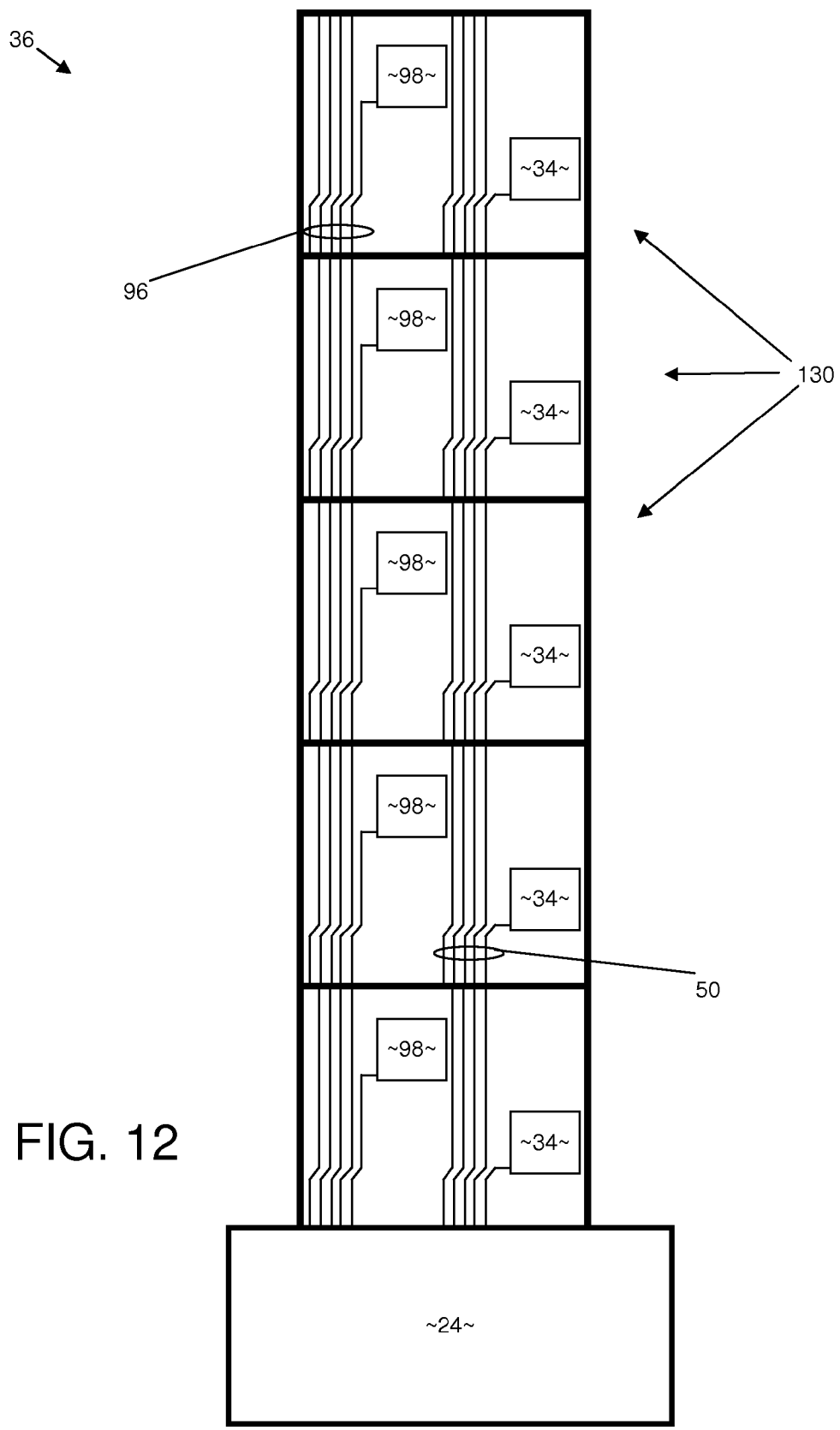
FIG. 12 illustrates yet another alternative preferred embodiment of the addressing network utilizing certain aspects of the present inventions.

While base plates may be used in some embodiments, base plates are not necessarily required, as shown in FIGS. 8 and 12. For example, FIG. 8 shows a two dimensional array of identical modules 76, which could be expanded to a three dimensional array. FIG. 12 shows a simplified one dimensional array of identical modules 130. The modules 130 may each have their own monitoring circuit 34 to provide the status information about each MOV 28 (not shown) to the controller 24. Each module 130 may also have their own indicator LEDs 98 to provide a visual indication of the status of each MOV 28 (not shown), or convey other information from the controller 24. Of course, Each module 130 may also have, or otherwise provide the functionality or features of the other embodiments. For example, each module 130 may also have the data lines 50 and indicator lines 98, shifted thereon, such that each module is uniquely identifiable according to its position in the array, or network 36.

Other and further embodiments utilizing one or more aspects of the inventions described above can be devised without departing from the spirit of Applicant's invention. For example, the lines 44,46,48,50 have been described as entering the modules 38 through the bottom connector 52 and exiting the modules 38 through the top connector 54. These lines, or any of them, may flow in another direction. Similarly, the outputs 56 and inputs 58 may likewise flow in another direction. Further, the various methods and embodiments of the modules 38,68 and base plate 40 can be included in various combinations with each other to produce variations of the disclosed methods and embodiments. For example, portions of the logic 42 associated with the modules 38 could be incorporated into the base plates 40, allowing use of fewer select lines 44 and/or allowing the addressing of more modules 38. Furthermore, while the network 36 has been described as a two dimensional array, the network 36 may be expanded into a three dimensional array.

Discussion of singular elements can include plural elements and vice-versa. For example, the data lines 50 have been discussed as being a single data line 50 carrying an analog, discrete digital, or digital serial signal. In alternative embodiments, the data lines 50 may comprise multiple lines carrying multiple analog signals, multiple discrete digital signals, multiple digital serial signals, and/or one or more digital parallel signals. Furthermore, rather than on demand, sequentially, continuously, substantially continuously, or periodically, the status information may be communicated randomly, semi-randomly, on a status change and/or an event and/or time driven basis. The modules 38,68,76,92 and/or base plates 40,104 may be embodied on, or incorporate, printed circuit boards. In any case, as discussed above, the modules 38,68,76,92 and base plates 40,104 are preferably identical to each other, in a given system 10.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. A power system comprising:
   a plurality of metal oxide varistors (MOV); and
   a controller operable to sequentially check each MOVs status using a multidimensional addressing network, the multidimensional addressing network comprising—
   three identical base plates connected in series, wherein each base plate includes three select lines and two address lines, and wherein each select line selects a different one of base plates;
   a plurality of substantially identical first modules, at least some of the first modules monitoring a different one of the MOVs, the first modules being connected in series, and wherein one of the first modules is coupled with a first one of the base plates;
   a plurality of substantially identical second modules, at least some of the second modules monitoring a different one of the MOVs, the second modules being connected in series, and wherein one of the second modules is coupled with a second one of the base plates;
   a plurality of substantially identical third modules, at least some of the third modules monitoring a different one of the MOVs, the third modules being connected in series, and wherein one of the third modules is coupled with a third one of the base plates;
   a serial communications link provided on the base plates and modules for providing status information relating to the surge suppressors to the controller; and wherein each module monitoring a MOV may be uniquely selected based at least in part on a physical location of the module relative to the base plates and other modules.

2. The power system as set forth in claim 1, wherein each module is substantially identical.

* * * * *